United States Patent
Utt

(10) Patent No.: US 6,490,527 B1
(45) Date of Patent: Dec. 3, 2002

(54) METHOD FOR CHARACTERIZATION OF ROCK STRATA IN DRILLING OPERATIONS

(75) Inventor: Walter K. Utt, Spokane, WA (US)

(73) Assignee: The United States of America as represented by the Department of Health and Human Services, Washington, DC (US)

(*) Notice: Subject to any disclaimer, the term of this patent is extended or adjusted under 35 U.S.C. 154(b) by 39 days.

(21) Appl. No.: 09/613,963

(22) Filed: Jul. 11, 2000

Related U.S. Application Data

(60) Provisional application No. 60/143,777, filed on Jul. 13, 1999.

(51) Int. Cl.$^7$ ................................................. G01V 1/28
(52) U.S. Cl. ........................... 702/9; 73/152.03; 175/50
(58) Field of Search .............................. 702/9; 700/174, 700/175, 177; 175/50; 73/81, 82, 152.03; 324/338, 339

(56) References Cited

U.S. PATENT DOCUMENTS

| | | |
|---|---|---|
| 2,620,386 A | 12/1952 | Alspaugh et al. |
| 2,741,468 A | 4/1956 | Alspaugh |
| 2,798,710 A | 7/1957 | Heimaster |
| 3,015,477 A | 1/1962 | Persson et al. |
| 3,876,251 A | 4/1975 | Boyd et al. |
| 4,097,854 A | 6/1978 | Black et al. |
| 4,192,550 A | 3/1980 | Heimaster |
| 4,200,335 A | 4/1980 | Moynihan et al. |
| 4,881,604 A | 11/1989 | Orthwein |
| 4,968,098 A | 11/1990 | Hirsch et al. |
| 4,981,327 A | 1/1991 | Bessinger et al. |
| 5,193,883 A | 3/1993 | Spies |
| 5,496,093 A | 3/1996 | Barlow |
| 5,678,643 A | 10/1997 | Robbins et al. |
| 5,742,740 A | 4/1998 | McCormack et al. |

FOREIGN PATENT DOCUMENTS

| | | |
|---|---|---|
| DE | 3818588 A | 12/1989 |
| JP | 9303071 | 11/1997 |
| SU | 1610003 A | 11/1990 |

OTHER PUBLICATIONS

Mowrey, G.L., "A New Approach to Coal Interface Detection: The In–Seam Seismic Technique", IEEE Transactions on Industry Applications, vol. 24, No. 4, Jul./Aug. 1988, pp. 660–665.*

King et al., "Using Artificial Neural Networks for Feature Detection in Coal Mine Roofs," *Computer Methods and Advances in Geomechanics*, Siriwardane et al. (eds.), A. A. Balkema, Rotterdam, Brookfield, vol. 3, pp. 1853–1857, 1994.

Masters, "Time–Series Prediction," *Practical Neural Network Recipes in C++*, Academic Press, pp. 48–54, 1993.

*Drilling and Excavation Technologies for the Future*, National Academy Press, Washington, D.C., p. 10, 1994.

(List continued on next page.)

*Primary Examiner*—Donald E. McElheny, Jr.
(74) *Attorney, Agent, or Firm*—Klarquist Sparkman, LLP

(57) ABSTRACT

A method and system for determining the relative strength and classification of rock strata in near real-time during drilling operations is provided for use in underground mines. Neural network technology is used to classify mine roof strata in terms of, for example, relative strength or strength index as the roof bolt hole is being drilled (i.e., in near real-time). Measurements taken while a layer of the rock strata is being drilled are used to compute the specific energy input and convert these data to suitably scaled features. A neural network is then used to classify the strength of the layer. The neural network can be trained using data of known rock strata classifications prior to using it to classify new measurements. The present system allows for detection of unsafe conditions within the rock strata being drilled, and allows appropriate warnings to be issued in near real-time so that appropriate actions can be taken.

21 Claims, 4 Drawing Sheets

OTHER PUBLICATIONS

Pollitt et al., "Lithological Interpretation Based on Monitored Drilling Performance Parameters," *CIM Bulletin*, vol. 84, No. 951, pp. 25–29, Jul. 1991.

McCormack, "Neural Computing in Geophysics," *Geophysics: The Leading Edge of Exploration*, pp. 11–15, Jan. 1991.

Kohonen, "The Basic SOM," *Self–Organizing Maps*, Springer–Verlag, New York, NY, pp. 85–144, 1997.

Kohonen, "Learning Vector Quantization," *Self–Organizing Maps*, Springer–Verlag, New York, NY, pp. 203–217, 1997.

Kohonen, "Glossary of "Neural" Terms," *Self–Organizing Maps*, Springer–Verlag, New York, NY, pp. 303–331, 1997.

Tsao et al., "Fuzzy Kohonen Clustering Networks," *Pattern Recognition*, vol. 27, No. 5, pp. 757–764, 1994.

King et al., "Using Unsupervised Learning for Feature Detection in a Coal Mine Roof," *Engng. Applic. Artif. Intell.* vol. 6, No. 6, pp. 565–573, 1993.

Rajasekaran et al., "Artificial Fuzzy Neural Networks in Civil Engineering," *Computers & Structures* vol. 61, No. 2, pp. 291–302, 1996.

Jordan et al., "Neural Networks," *The Computer Science and Engineering, Handbook*, CRC Press, Tucker (ed.), pp. 536–556, 1997.

Teale, "The Concept of Specific Energy in Rock Drilling," *Int. J. Rock Mech. Mining Sci.*, vol. 2, pp. 57–73, 1965.

Specht, "Probabalistic Neural Networks for Classification, Mapping, or Associative Memory," *Proceedings IEEE Second International Conference on Neural Networks (San Diego, CA)*, vol. 1, pp.I–525 through I–532, 1988.

Reilly et al., "A Neural Model for Category Learning," *Biol. Cybern.*, vol. 45, pp. 35–41, 1982.

*Data Engine V.i, Data Mining by Intelligent Data Analysis, Part I: Basics*, MIT GmbH Data Analysis, pp. I–40 through I–66, 1996.

*Data Engine V.i, Data Mining by Intelligent Data Analysis, Part II: User Manual Function Reference Tutorials*, MIT GmbH Data Analysis, pp. 5–1 through 5–29, 1996.

*Handbook of Physical Properties of Rocks*, vol. II, Carmichael (ed.), CRC Press, Inc., Boca Raton, FL, p. 306, 1982.

Feng et al., "Neural Network Model for Real–Time Roof Pressure Prediction in Coal Mines," *Geomechanics Abstracts*, vol. 33, No. 6, pp. 647–653 (abstract only, 1 page), 1996.

Zhang et al., "Artificial Neural Network Model for Coal–Face Roof Category Recognition," *Xiangtan Kuangye Xueyuan Xuebao/Journal of Xiangtan Mining Institute*, vol. 9, No. 4, pp. 1–5 (abstract only, 1 page), 1994.

Zhang et al., "Prediction of Intervals of Main Roof Weighting by an Artificial Neural Network," *China Coal Society*, vol. 20, No. 1, pp. 25–28 (abstract only, 1 page), 1995.

Lin et al., "Closed Intelligent System for Optimal Support Design of Underground Excavations," *International Journal of Rock Mechanics and Mining Sciences*, vol. 34, Nos. 3–4, p.675 (abstract only), Apr.–Jun. 1997.

Nichols et al., "Neural Network Coupled Acoustic Emission Sensors for Rock Grinding and Drilling," *Emerging Computer Techniques for the Minerals Industry Symp./Emerging Comput. Tech. Miner Ind.*, Society for Mining, Metallurgy & Exploration, Inc., Littleton, CO, pp. 287–293 (abstract only, 1 page), 1993.

Guanglin et al., "Neural Network Coupled Acoustic Emission Sensors for Rock Grinding and Drilling," *Chengdu Institute of Technology*, vol. 23, No. 3, pp. 58–63 (abstract only, 1 page), 1996.

"Executive Summary," *U.S. Mining Machinery*, Snapshots International, Ltd., p. 1, Jun. 1, 1997.

"Mining & Oil Field Machinery Sales by Market: Coal Mining– Underground Coal Mining Markets," *Mining and Oil Field Equipment to 1997*, The Freedonia Group, Inc., p. 1, Dec. 1993.

"Mining Equipment by Type: Underground Mining Machinery– Roof Bolters," *Mining and Oil Field Equipment to 1997*, The Freedonia Group, Inc., p. 1, Dec. 1993.

"Recent Mine Safety R&D Projects of the U.S. Bureau of Mines," *Engineering & Mining Journal*, vol. 196, No. 11, pp. 26–28, Nov. 1995.

"Making a Show of Control," *Manufacturing Chemist*, vol. 65, No. 4, pp. 29–30, Apr. 1994.

Itakura et al., "Estimation of Roof Structure by Mechanical Data Logging System for a Roofbolter," *Coal & Safety*, No. 13, pp. 42–56, Sep. 1998.

\* cited by examiner

METHOD FOR CHARACTERIZATION OF ROCK STRATA IN DRILLING OPERATIONS

RELATED APPLICATION

This application is based on, and claims benefit of, U.S. Provisional Application Ser. No. 60/143,777, filed on Jul. 13, 1999.

FIELD OF THE INVENTION

The present invention relates to methods of characterization of rock strata in underground mining operations. More specifically, this invention relates to real-time methods employing neural networks for assessing the relative strength of rock strata, and, thus, relative risk of roof collapse or failure during roof bolting and similar operations.

BACKGROUND OF THE INVENTION

Currently there are about 2,000 underground mines operating in the United States,. including about 1,200 to 1,400 coal mines, about 500 to 600 mineral mines, and about 100 stone mines. Roof bolting is an essential, although extremely hazardous, operation in underground mines to maintain the integrity of a horizontal mine shaft and to help prevent the roof of the mine from collapsing during or after the earth and desired mineral or product has been excavated from the shaft end. Placement of roof bolts (generally about 1 to 3 meters long) is used to reinforce the rock and to significantly enhance the safety of later miners working in the mine environment.

The actual workers drilling and placing the roof bolts are, however, exposed to the significant risk of roof collapse or failure during the bolting operations. As the mine face is extended, a bolting machine first drills holes in the passageway roof and then inserts and sets bolts into the mine roof to keep the roof from collapsing. In order to improve safety, some mining machines have integrated the roof bolting apparatus into the continuous mining machines, thereby reducing the risk of roof collapse. Roof bolting apparatus generally incorporate roof support members to further support the roof during installation of the bolts. Since roof bolting is one of the most dangerous operations in all of underground mining, roof bolters that work ahead of the continuous miner are also being developed. These pre-mining bolters drill into the seam to be mined and insert bolts at this early stage, thereby greatly reducing the risk of roof collapse. These newer roof bolter units may incorporate contemporary robotics technology. In spite of these safety precautions and improvements, the operators of the roof bolting machines and their helpers still are exposed to significant risk; in fact, even with these advances, the process of drilling and bolting the roof is currently one the most dangerous jobs in underground mining. Approximately 1,000 accidents with injuries occur each year in the United States which can be attributed to roof bolting operations.

It would be desirable, therefor, to provide additional methods to increase the safety of underground miners, especially those involved in drilling and placement of roof bolts. It would also be desirable to provide methods which allow real-time or near real-time characterization of the roof strata, including relative strength of the roof strata, as the roof bolt holes are being drilled. It would also be desirable to provide methods and monitoring systems that can be used with conventional roof drilling and bolting machines that can assess the integrity of a mine roof and provide real time warning to the roof drill operator when a weak layer is encountered in the rock strata. The present invention employs neural network techniques to provide such methods and devices. Thus, measurements taken while roof bolt bore is being drilled can be converted to suitably scaled features which allows the various layers of rock strata encountered in the drilling operation to be classified as to relative strength using a neural network. Suitable warning devices can be activated as the drilling progresses if weak or otherwise unsafe strata are encountered.

SUMMARY OF THE INVENTION

The present invention provides methods for the characterization of rock strata in underground mining operations during drilling operations. More specifically, this invention provides real-time or near real-time methods using neural networks for assessing the relative strength of rock strata, and, thus, relative risk of roof collapse or failure during roof bolting and similar operations. Using the data generated, real-time or near real-time decisions can be made regarding the relative strength of the rock strata to provide bolter operators and other workers warning of questionable rock layers. Using this information, modification of support and/or roof bolting strategies can be made in near real-time. In addition, advanced warning of potentially unsafe roof conditions can be generated. The ability to provide near real-time data and/or warnings regarding the rock strata and drilling operations is especially important since the process of drilling and bolting the roof is currently one of the most dangerous jobs in underground mining. By using the present monitoring system on a roof drill to assess the integrity of a mine roof, a roof drill operator could be warned when a weak layer is encountered. Such a warning could make the difference between life and death for the operator.

For purposes of this invention, "real-time" or "near real-time" determinations or processes are meant to include relatively short time frames such that the relevant information being gathered can be converted into useful and predictive output information during the actual drilling operation so as to allow the operator to modify his or her actions based on the information being supplied. In other words, the delay from the time the data is collected during the drilling operation to the time in which the results of the neural network classification system are available to the operator is relatively short (i.e., preferably within about 1 minute, more preferably within about 10 seconds, and most preferably within about a second).

A cross-section of a typical mine roof and various types of roof support, including bolts, are shown in FIG. 1. As can be seen, mine roof structure can include numerous types or layers of rock. The roof structure can significantly change between roof bolt locations. Thus, an operator drilling roof bolt holds can encounter very different rock strata. Thus, it would be desirable to provide real-time or near real-time data regarding the stability and relative strength of the rock strata encountered during drilling to allow the operator to take the necessary safety precautions (including both short- and long-term precautions) as soon as an unstable situation arises.

The present invention utilizes neural network technology in order to classify mine roof strata in terms of, for example, relative strength. That is, measurements taken while a layer is being drilled can be used to compute the specific energy input and convert these data to suitably scaled features. A neural network is then used to classify the strength of the layer. The neural network can be trained using data of known rock strata classifications prior to using it to classify new measurements. Data from actual drilling operations can be used to upgrade and/or improve the recognition or classification of rock strata by the neural network.

One object of the present invention is to provide a method for determining and analyzing, in near real-time, the relative strength of rock strata during drilling operations in an underground mine, said method comprising (1) collecting data from a plurality of sensors monitoring a rock drill during roof bolt drilling operations;

(2) converting the data to computer readable input data using transducers coupled with the plurality of sensors in near real-time;

(3) analyzing the computer readable input data in near real-time using a neural network analyzer to determine relative strength and classification of the rock strata encountered by the rock drill; and (4) providing an output signal detailing the relative strength and classification of the rock strata encountered by the rock drill in near real-time.

Another object of the invention is to provide a method for determining and analyzing, in near real-time, the relative strength of rock strata during drilling operations, said method comprising (1) collecting data from a plurality of sensors monitoring a rock drill during drilling operations;

(2) converting the data to computer readable input data using transducers coupled with the plurality of sensors in near real-time;

(3) analyzing the computer readable input data in near real-time using a neural network analyzer to determine relative strength and classification of the rock strata encountered by the rock drill; and (4) providing an output signal detailing the relative strength and classification of the rock strata encountered by the rock drill in near real-time.

Still another object of the present invention is to provide a system for determining and analyzing, in near real-time, the relative strength of rock strata during drilling operations in an underground mine, said system comprising (1) a plurality of sensors for monitoring and collecting a plurality of subsets of data from a rock drill, wherein the plurality of the subsets of data correspond to layers of rock encountered by the rock drill during roof bolt drilling operations;

(2) transducers coupled with the plurality of sensors to convert the subsets of data from the rock drill to computer readable data in near real-time;

(3) a computer system to accept and analyze the computer readable data in near real-time using a neural network analyzer to determine relative strength and classification of the rock strata encountered by the rock drill; and (4) an output device coupled to the computer system to provide an output signal detailing the relative strength and classification of the rock strata encountered by the rock drill in near real-time. Preferably, the output device includes both audio and visual signaling capabilities to warn the rock drill operator and other workers in the area if unstable and unsafe rock strata are encountered so that the operator and other workers can take appropriate actions in near retal-time.

These and other objects and advantages of the present invention will be apparent to those skilled in the art upon a consideration of the present specification.

DETAILED DESCRIPTION OF THE INVENTION

The present invention provides a method and system for determining the relative strength and classification of rock strata in near real-time during drilling operations. Although the invention is mainly directed to roof bolting operations in underground mines, it can also be used in other drilling operations where the relative strength of the rock strata is important. Thus, for example, the present invention could be used in drilling holes for blasting in mining and/or construction since rock strength is an important consideration in blasting efficiency.

Figure 1:
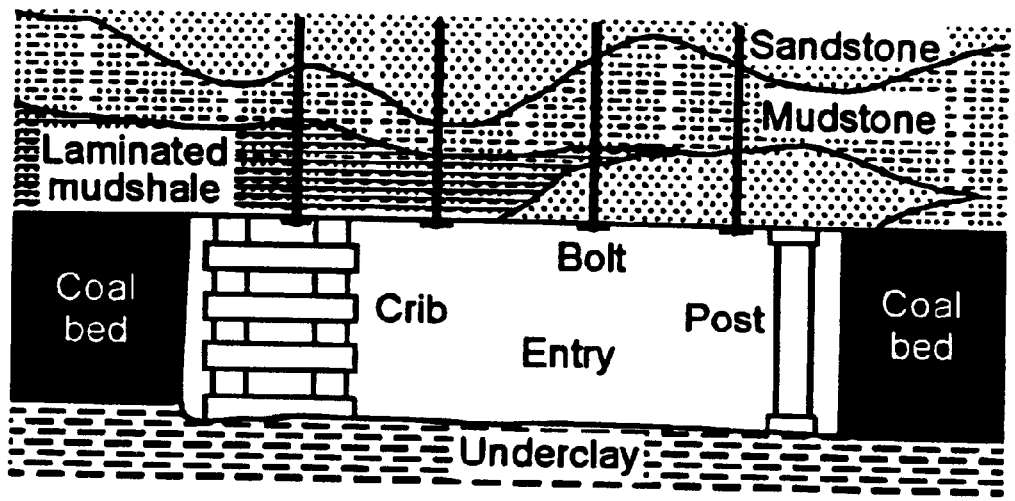
FIG. 1 provides a typical cross-section of a mine roof and typical support systems (i.e., crib, roof bolts, and posts).

A cross-section of a typical mine roof and various types of roof support, including bolts, are shown in FIG. 1. As can be seen, mine roof structure can include numerous types or layers of rock. The roof structure can significantly change between roof bolt locations. Thus, an operator drilling roof bolt holds can encounter very different rock strata. Thus, it would be desirable to provide real-time or near real-time data regarding the stability and relative strength of the rock strata encountered during drilling to allow the operator to take the necessary safety precautions (including both short- and long-term precautions) as soon as an unstable situation arises.

As can also be seen in FIG. 1, different support systems, including roof bolts, cribs, and posts, can be used. The efficient and safe use of such support systems will depend on a number of factors, including, for example, the relative strength of the rock strata within the mine roof, the extent of the entry area required to move equipment and remove coal seam material and/or overburden, and the like. The more detailed information that can be obtained regarding the relative strength of the roof materials and the different layers within the roof structure, the easier it will be to design the total roof support system (i.e., the number and locations of roof bolts, cribs, posts, and other support systems). Such detailed information can, of course, and especially if such information can be generated in near real-time, significantly improve mine safety. The present invention provides a method and system for obtaining such information during drilling operations for roof bolt placement. In addition, such information contributes to the safety of the roof bolt drilling operator and other workers during the drilling operation itself.

The present invention utilizes neural network technology in order to classify mine roof strata in terms of, for example, relative strength or strength index. That is, measurements taken while a layer is being drilled can be used to compute the specific energy input and convert these data to suitably scaled features. A neural network is then used to classify the strength of the layer. The neural network can be trained using data of known rock strata classifications prior to using it to classify new measurements. Data from actual drilling operations can be used to upgrade and/or improve the recognition or classification of rock strata by the neural network. Thus, the neural network technique allows the system to "learn" as additional data become available. A functional strata characterization program is designed to interface with an instrumented rock drill. Torque, rotation rate, thrust, penetration rate, depth of the drill tip, and similar parameters are measured and converted to electrical signals by transducers. This information from the various sensors flows through interface boards to a computer with a data acquisition program that includes a graphics display (see generally FIG. 2). The data is preferably smoothed by averaging to remove or at least minimize the "noise" generated in drilling operation. The specific energy of drilling (SED) can be computed. SED is the drilling energy input or work done per unit volume of rock excavated (Teale, R. (1995) "The Concept of Specific Energy in Rock Drilling," *Int J. Rock Mech. Min. Sci. & Geo. Abs.*, Vol. 2, pp. 57–73).

Figure 2:
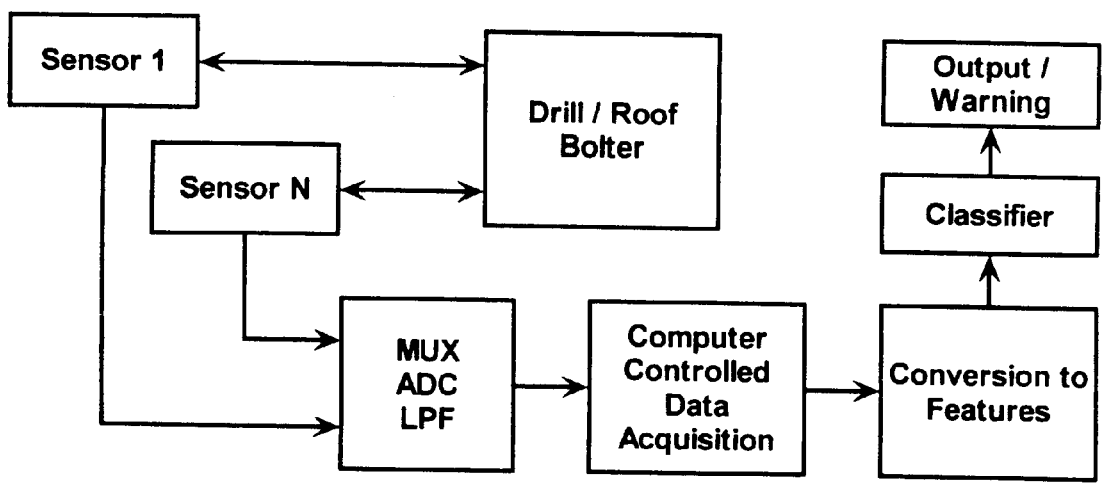
FIG. 2 provides a simplified flow chart illustrating the method and system of the present invention.

The computer program block diagram shown in FIG. 2 consists of three major parts: data acquisition, conversion to features, and the classifier. Sensor 1 through N collect specific data from the drill or roof bolter system. Suitable data or parameters include, for example, torque, rotation rate, thrust, penetration rate, depth of the drill tip, and similar parameters. The data from the sensors are converted by transducers to provide computer readable signals. The measurement data preferably flow through a multiplexer (MUX) into an analog to digital converter (ADC) using a low pass filter (LPF) to reduce or prevent signal aliasing. The treated measurement data are passed to the computer controlled data acquisition system for conversion into features. The features are then used in the classifier (i.e., neural network) to determine the relative strength or other parameters associated with the rock layers or strata encountered during drilling. Commercially available neural network programs can be used for the classification process. Based on the results obtained in the classification process, output or warning signals can be generated. Preferably these output or warning signals include both visual and audio components (e.g., flashing lights and horns to warn of unstable or unsafe conditions).

The specific energy of drilling (SED) includes both rotational and translational energy. Rotational energy is usually much larger than translational energy. However, if thrust is zero, there will be no significant penetration, even if the rotational energy input is high. SED usually ranges from equivalence to about twice the compressive strength of the material being drilled and is a useful feature for strength classification if drilling parameters are within the normal operating range. Consequently, it is advisable to monitor initial measurements to be certain they are within the normal range of operation. The SED can be used in combination with penetration rate, for example, to provide a minimum set of features for the classifier. The other measurements can be used as supplementary features, if desired. Alternatively, more than two such parameters can be used to provide a larger set of primary features for the classifier.

Since strength is to be evaluated while drilling is still underway, it is necessary to continuously process a subset of data corresponding to each layer. A subarray that corresponds to the layer of material being drilled is converted to suitably scaled features for a neural network classifier. A pipeline processing system is an appropriate method for processing the data while drilling through successive layers. A graphic display for the results can be provided. Generally, however, the generation of graphic representations of the results can result in delays. Thus, it is preferred that alternative warning signals (for example, visual and/or audio) be used to provide rapid, near real-time warning if unstable or dangerous conditions are encountered.

Two commercial neural network packages (EZ-1 and Data Engine) have been evaluated. The EZ-1 system is a package of supervised neural network techniques with an accelerator board (Pryor Knowledge Systems, Inc. (1995). EZ-1 Neural Network System-Basic. Bloomfield Hills, Mich., 74 pp.). The EZ-1 package contains three alternative software programs as follows:

(1). A probabilistic neural network (Specht, Donald F., (1988), "Probabilistic Neural Networks for Classification Mapping, Mapping, or Associative Memory;" in *Proceedings IEEE Second International Conference on Neural Networks* (San Diego,. Calif.). Vol. 1, pp. 525–532;

(2). The RCE system (Reilly, Cooper, Elbaum) or the Self Organizing General Pattern Class Separator and Identifier (Reilly, D. L., L. N. Cooper, and C. Elbaum (1982), A Neural Model for Category Learning, *Biol. Cybemetics*, Vol. 45, pp. 35–41; and (3). PRCE which combines of the probabilistic and the RCE programs.

The Data Engine is a package of-unsupervised neural network techniques (MIT GmbH (1996). Data Engine V.i. Data Mining by Intelligent Data Analysis. Part 1: Basics, 81 pp.; Part 11: User Manual, Function Reference, and Tutorials, 262 pp. Aachen, Germany). This package contains two alternative software programs as follows:

(4). Kohonen's self-organizing feature mapping algorithm (Kohonen, T. (1995), Self-organizing Maps, Springer-Verlag, New York, N.Y., 362 pp); and (5). Fuzzy cluster means combined with Kohonen's algorithm (Tsao, E.C-K., J. C. Bezdek, and N. R. Pal (1982), "Fuzzy Kohonen Clustering Networks," *Pattem Recognition*, Vol. 27, No. 5, pp. 757–764.)

Figure 3:
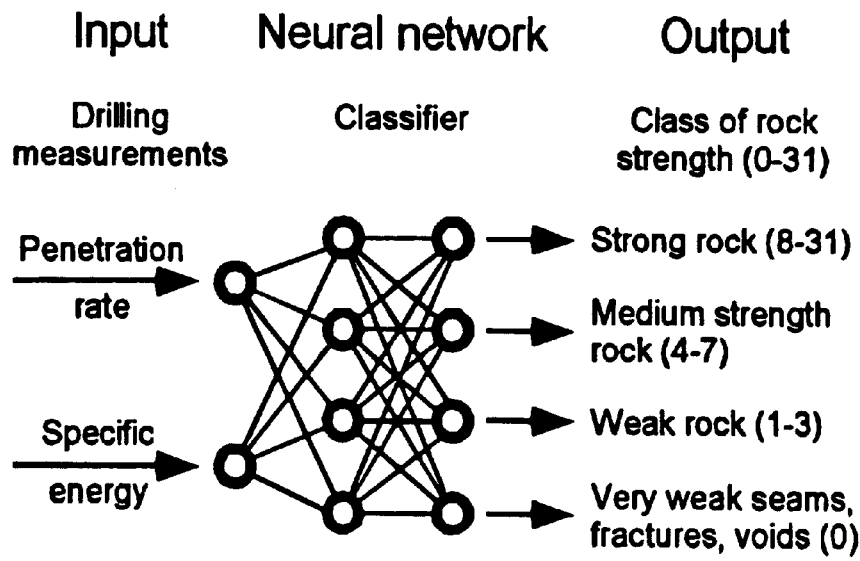
FIG. 3 illustrates a conceptional neural network for the present invention.

All five alternatives included in these two commercial packages are satisfactory for use in the present system. Likewise, other similar neural network systems would also be expected to provide satisfactory results when used in the present invention. Primarily due to compatibility considerations, the learning algorithm of Kohonen (alternative 4) was generally preferred and allowed for crisp classification of layer strength. Naturally occurring rock varies considerably in both composition and strength. Although other classification systems can be used, the 32 classes of rock strength provided by Cannichael (*Handbook of Physical Properties of Rocks*, Vol. 2 CRC Press, Boca Raton, Fla., 306 pp. (1982)) was used. The neural network was trained with data of known classifications prior to using it to classify new measurements. The conceptual network is shown in FIG. 3 using specific energy and penetration rate as input data; of course, other parameters could also be used. FIG. 3 also illustrates the rock classification system used. The actual network would, of course, have many more neurons. Classification output can be monitored on a computer graphics display. For signaling a warning, the classifications can be grouped into three color categories: red for weak strength, yellow for medium strength, and green for strong.

Alternate feature vectors were investigated using previous generated drilling data and geological classes in the manner of King and Signer ("Using Artificial Neural Networks for Feature Detection in Coal Mine Roofs," in *Computer Meth-* ods and Advances in Geomechanics. *Proceedings of the Eighth International Conference on Computer Methods and Advances in Geomechanics*, ed. by H. J. Siriwardane and M. M. Zairian (Morgantown, W V, May 22–28, 1994). Vol. 3, Balkema, Rofterdam, pp. 1853–1857). After the neural network was trained on some of the existing data files, it was used to classify data from other drilling operations and was found to be successful in discriminating layers. The two features used (i.e., SED and penetration rate) were found to be satisfactory for classifying different layers into the proper geological classes. The full set of five features (SED, torque, rotation rate, thrust, and penetration rate) gave comparable performance at discriminating layers.

The fuzzy clustering algorithm (alternative 5 above) automatically identified a start-in class, which corresponds to observations made of the drill entering the rock. When the drill first enters the rock, there is a lot of chatter, and the data are very noisy. When the drill tip is at a depth sufficient to quell the chaffer, it is said to have established a collar. In fact, the data obtained prior to reaching the collar depth should generally not be used in the overall strength classification, since it would be misleading. The initial data could be, however, separately examined for any unusual occurrences and/or features encountered during the initial drilling phase.

Using the present system, drilling measurements for each roof bolt hole can be processed and the essential information displayed for the operator to monitor in near real-time. A file of selected information for each borehole can be stored for later retrieval for detailed analysis. Such detailed analysis could be used, for example, to improve performance of the neural network system (i.e., "learning"). Drilling data are, of course, likely to be noisy. Consequently, measurements are preferably processed in subsets to allow for statistical smoothing and conversion into features for each layer. Preferably, the. features are scaled for use in the neural network classifier.

Figure 4:
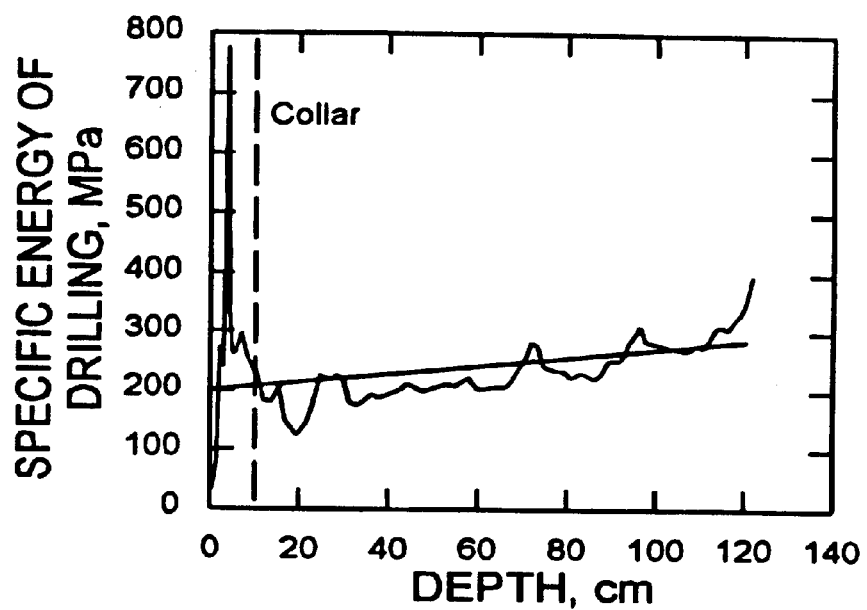
FIG. 4 provides a plot of the specific energy of drilling (Mpa) as a function of depth during a typical drilling operation.
Figure 5:
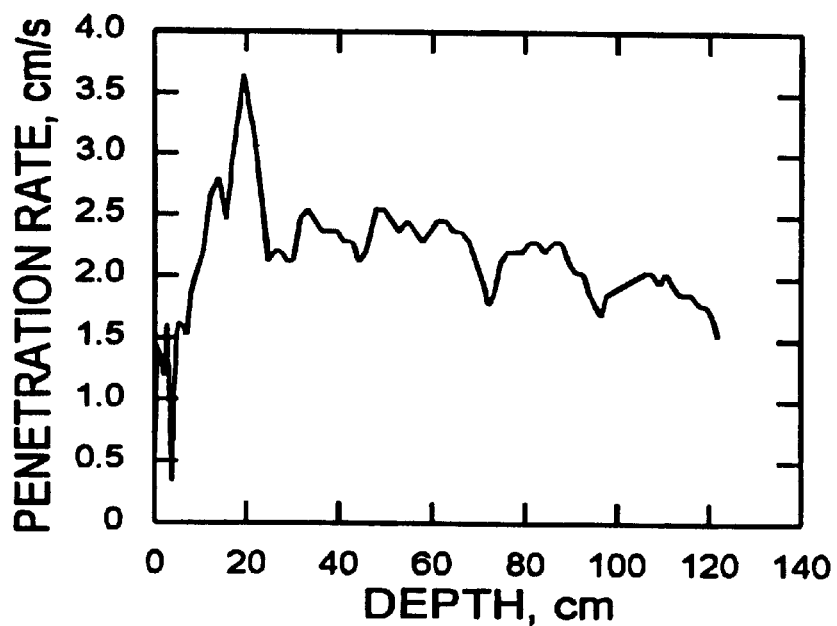
FIG. 5 provides a plot of penetration rate (cm/sec) as a function of depth during a typical drilling operation FIG. 6 provides a plot of strength index class versus depth based on the data presented in FIGS. 4 and 5.

Typical drilling data from a borehole were processed. SED is presented as a function of the depth of the drill tip in FIG. 4. The spurious peaks during initial drilling (i.e., up to collar depth—generally about 10 cm) are preferably not used in estimating rock strength. There is a linear upward trend in the SED curve that is probably caused by friction. The steel drill shaft bends under thrust and rubs in the borehole. It is generally recommended that such trends be removed from the data before classification (see, for example, Masters, T. (1993), *Practical Neural Network Recipes in* C++. Academic Press, San Diego, Calif., 493 pp.). Penetration rate is presented as a function of depth in FIG. 5. The penetration rate indicates the results of the drilling process, while SED represents work put into the rock. Neither feature is without shortcomings, but together they provide a reliable representation of the strength of the rock.

Figure 6:
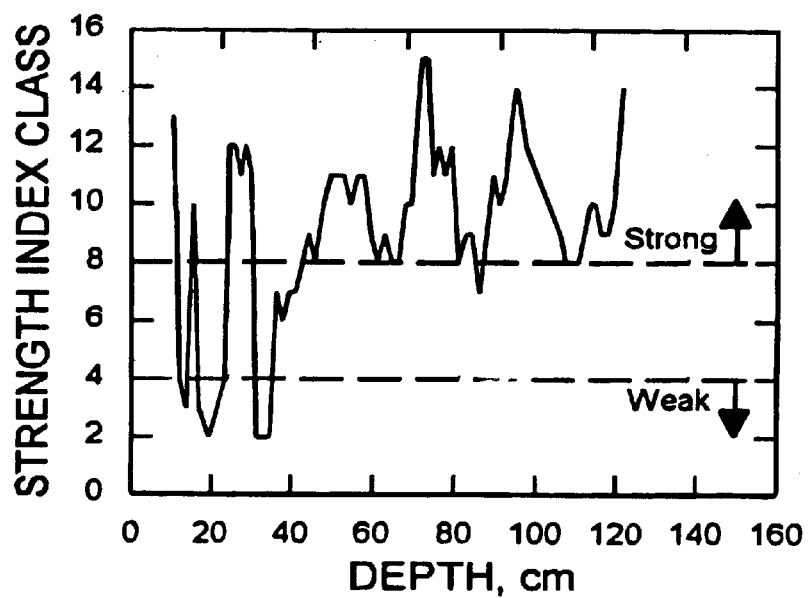

The network was trained on data for which the strength was known and labeled accordingly. Data from a typical borehole were placed into one of 32 classes of compressive strength. A strength index class is presented as a function of depth in FIG. 6 for the drilling data provided in FIGS. 4 and 5. There are three layers where the strength index drops below 4, indicating that those layers are weak and not suitable for anchoring. The deeper layers have a strength index greater than 8, which means they are strong enough to provide a good anchor. If an estimate of compressive strength is required, it can be obtained. For example, the index value of 4 corresponds to 31,030±3,447 kPa. However, the strength index class is suitable for use in the present invention.

Figure 7:
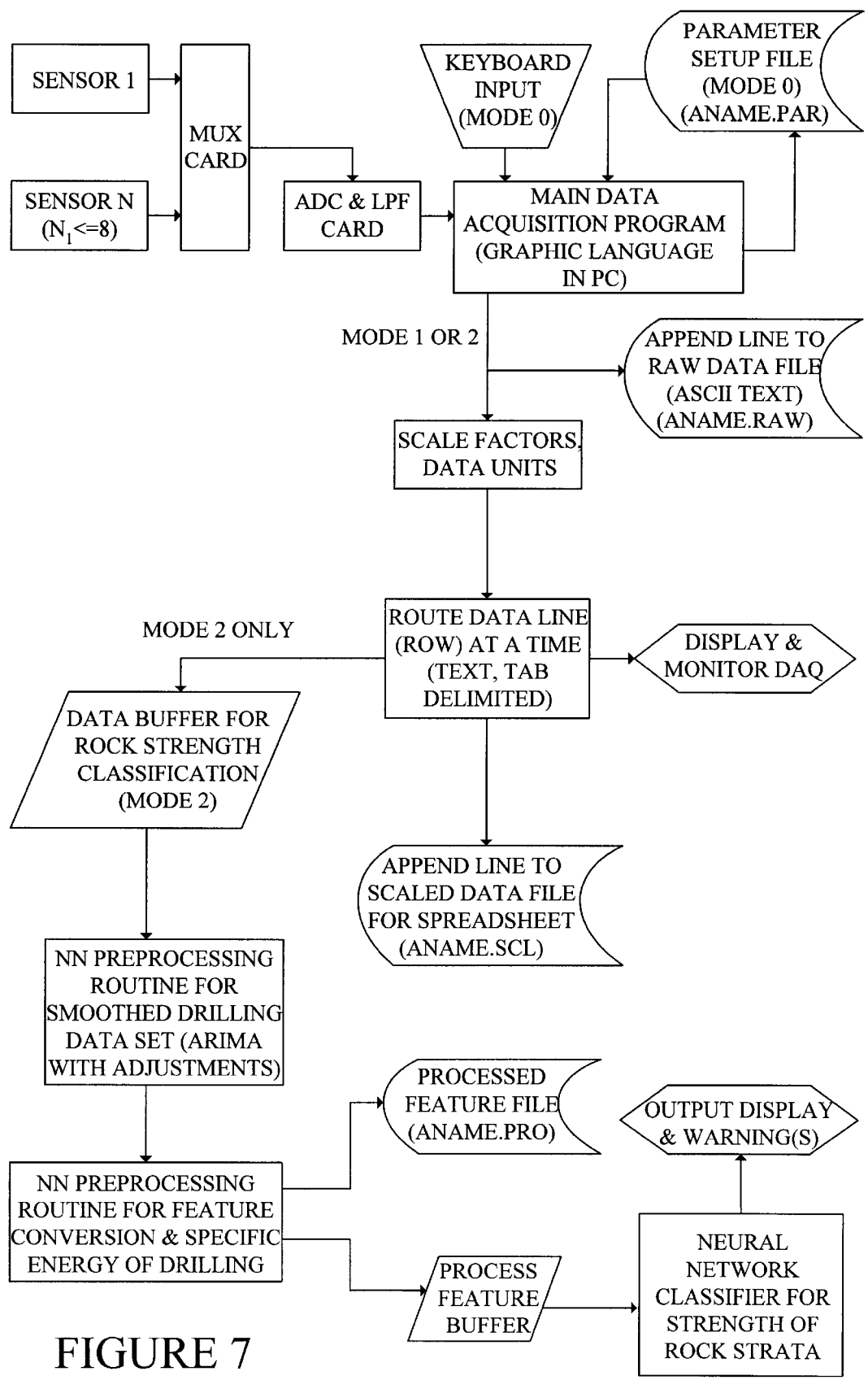
FIG. 7 provides a detailed flowchart illustrating the method and system of the present invention.

A more detailed flow chart illustrating the drilling data flow for rock strata classification is depicted in FIG. 7. The drilling measurements are sensed and converted to electrical signals by transducers. These sensors can be used to measure, for example, depth of the drill tip in the rock, thrust, penetration rate, torque, rotation rate, and similar performance parameters. The system shown is designed to accept input from up to eight sensors. Of course, more sensors can be employed if desired. The measurement data flow through a multiplexer (MUX) into an analog to digital converter (ADC) with a low pass filter (LPF) for the prevention of signal aliasing. The main data acquisition program is preferably a graphics language on a personal computer. The basic data acquisition process (i.e., Mode 1) is used to record a raw data file and a separate file containing scaled data (i.e., scaled to have the desired units). The data acquisition (DAQ) process can be monitored on the computer display screen. The branch leading through preprocessing routines and to the neural network classifier is designated as Mode 2. The specific energy of drilling is calculated so that it can be used as a feature, along with the basic measurements. The data are passed along in subarrays, which may generally be from 10 to 50 samples in length, so that results can be generated while drilling is still underway. After the appropriate training, the neural network can classify the rock or coal strata according to relative strength. The neural network can be trained on data with known classifications prior to use for classifying new measurement data. Data generated can be saved for further analysis and for further training of the neural network system. The output can be monitored on a computer display and warnings (visual and/or audio) can be broadcast when a weak and dangerous layer is detected. Moreover, data regarding unsafe or dangerous conditions can be transmitted to the operator located at a safe distance and/or within a protective structure.

The feasibility of using a drill monitoring system to estimate the strength of successive layers of roof rock during the actual drilling has been demonstrated. This system provides near real-time results which allows increased safety in placement and installation of roof bolts in underground mining. The present system should be applicable in all underground mines. The technology could also be extended to other rotary drilling applications, such as drilling holes for blasting in mining and construction, since rock strength is an important consideration in efficient blasting. The application of neural network technology to strength classification of the material being drilled and estimating the strength index class as the material is being drilled (i.e., in near real-time) is a significant advance in mine technology safety.

All references cited herein are hereby incorporated by reference.

We claim:

1. A method for determining and analyzing, in near real-time, the relative strength of rock strata during drilling operations in an underground mine, said method comprising
    (1) collecting data from a plurality of sensors monitoring a rock drill during roof bolt drilling operations;
    (2) converting the data to computer readable input data using transducers coupled with the plurality of sensors in near real-time;
    (3) analyzing the computer readable input data in near real-time using a neural network analyzer to determine relative strength and classification of the rock strata encountered by the rock drill in near real-time during drilling operations.

2. The method as defined in claim 1, wherein the collected data from the rock drill includes torque, rotation rates, thrust, penetration rates, or depth of drill tip.

3. The method as defined in claim 2, wherein the collected data are used to determine specific energy of drilling, and wherein the specific energy of drilling and at least one other collected data from the rock drill are employed in the neural network analyzer.

4. The method as defined in claim 3, wherein the other collected data is penetration rates.

5. The method as defined in claim 4, wherein near real-time is one second or less.

6. The method as defined in claim 5, further comprising, if the analyzing indicates an unsafe condition, activating an alarm warning workers operating the drill.

7. A method for determining and analyzing, in near real-time, the relative strength of rock strata during drilling operations, said method comprising (1) collecting data from a plurality of sensors monitoring a rock drill during drilling operations;

(2) converting the data to computer readable input data using transducers coupled with the plurality of sensors in near real-time;

(3) analyzing the computer readable input data in near real-time using a neural network analyzer to determine relative strength and classification of the rock strata encountered by the rock drill; and (4) providing an output signal detailing the relative strength and classification of the rock strata encountered by the rock drill in near real-time during drilling operations.

8. The method as defined in claim 7, wherein the collected data from the rock drill includes torque, rotation rates, thrust, penetration rates, or depth of drill tip.

9. The method as defined in claim 8, wherein the collected data are used to determine specific energy of drilling, and wherein the specific energy of drilling and at least one other collected data from the rock drill are employed in the neural network analyzer.

10. The method as defined in claim 9, where the other collected data are penetration rates.

11. The method as defined in claim 10, wherein near real-time is one second or less.

12. The method as defined in claim 11, further comprising, if the output signal indicates an unsafe condition, activating an alarm.

13. A system for determining and analyzing, in near real-time, the relative strength of rock strata during drilling operations in an underground mine, said system comprising (1) a plurality of sensors for monitoring and collecting a plurality of subsets of data from a rock drill, wherein the plurality of the subsets of data correspond to layers of rock encountered by the rock drill during roof bolt drilling operations;

(2) transducers coupled with the plurality of sensors to convert the subsets of data from the rock drill to computer readable data in near real-time;

(3) a computer system to accept and analyze the computer readable data in near real-time using a neural network analyzer to determine relative strength and classification of the rock strata encountered by the rock drill; and (4) an output device proximate the rock drill and coupled to the computer system to provide an output signal detailing the relative strength and classification of the rock strata encountered by the rock drill in near real-time.

14. The system as defined in claim 13, wherein the collected subsets of data from the rock drill includes torque, rotation rates, thrust, penetration rates, or depth of drill tip.

15. The system as defined in claim 14, wherein the collected subsets of data are used to determine specific energy of drilling, and wherein the specific energy of drilling and at least one other collected subset of data from the rock drill are employed in the neural network analyzer.

16. The system as defined in claim 15, where the other collected subset of data are penetration rates.

17. The system as defined in claim 16, wherein near real-time is one second or less.

18. The system as defined in claim 17, further comprising an alarm that is activated if the output signal indicates an unsafe or hazardous condition.

19. A method for presenting stability data for rock strata during mining operations via a plurality of sensory monitoring the mining operations and a trained neural network, the method comprising:

collecting data from the plurality of sensors monitoring the mining operations, the data comprising stability measurements for one or more rock strata;

transmitting the data to the trained neural network;

receiving a signal from the trained neural network; and during the mining operations, providing an output signal based on the signal from the trained neural network.

20. The method of claim 19 wherein the output signal is presented in near real-time during the mining operations.

21. The method of claim 19 wherein the output signal is presented proximate the mining operations.

* * * * *

UNITED STATES PATENT AND TRADEMARK OFFICE
CERTIFICATE OF CORRECTION

PATENT NO.   : 6,490,527 B1
DATED        : December 3, 2002
INVENTOR(S)  : Walter K. Utt It is certified that error appears in the above-identified patent and that said Letters Patent is hereby corrected as shown below:

Column 1,
Line 21, "United States.," should read -- United States, --.

Column 7,
Line 10, "Intemational" should read -- International --.
Line 35, "the." should read -- the --.

Signed and Sealed this

Twenty-second Day of June, 2004

JON W. DUDAS
*Acting Director of the United States Patent and Trademark Office*